Nov. 4, 1924.

J. L. THOMSON 1,514,270

MEANS FOR TEACHING READING AND THE LIKE

Filed April 27, 1922    2 Sheets-Sheet 1

WITNESS

Wm. L. Bell.

INVENTOR,
Jennie L. Thomson,
ATTORNEY.

Nov. 4, 1924.　　　　　　　　　　　　　　　　　1,514,270
J. L. THOMSON
MEANS FOR TEACHING READING AND THE LIKE
Filed April 27, 1922　　　2 Sheets-Sheet 2
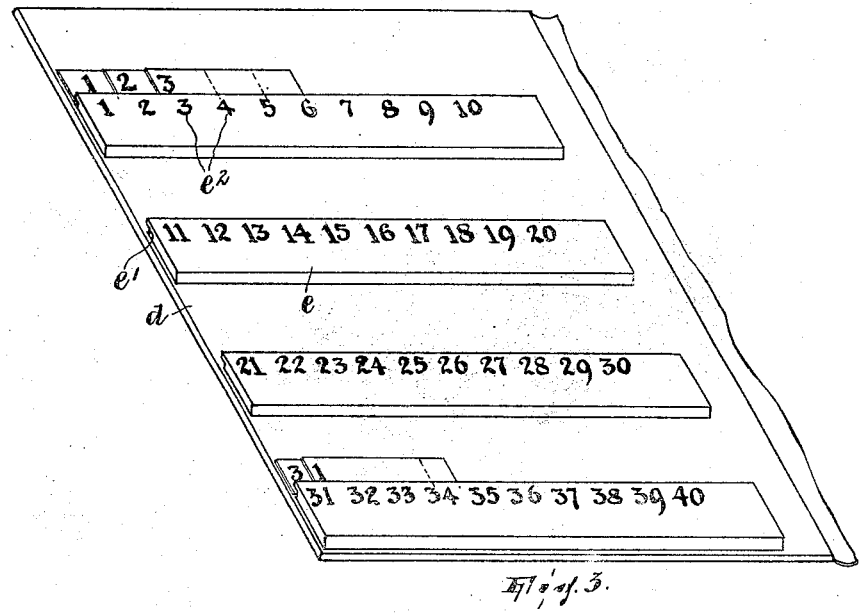
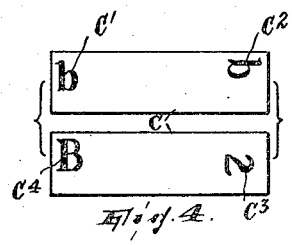
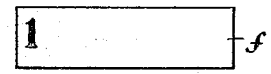
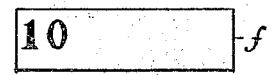
WITNESS
INVENTOR,
Jennie L. Thomson,
ATTORNEY.

Patented Nov. 4, 1924.

1,514,270

UNITED STATES PATENT OFFICE.

JENNIE L. THOMSON, OF TUNKHANNOCK, PENNSYLVANIA.

MEANS FOR TEACHING READING AND THE LIKE.

Application filed April 27, 1922. Serial No. 556,974.

*To all whom it may concern:*

Be it known that I, JENNIE L. THOMSON, a citizen of the United States, residing at Tunkhannock, in the county of Wyoming and State of Pennsylvania, have invented certain new and useful Improvements in Means for Teaching Reading and the like, of which the following is a specification.

This invention relates to the art of teaching the characters used in reading, as those used in forming numbers. The invention contemplates certain improvements in the general class of those set forth in my Patents Nos. 1,099,324, 1,263,626 and 1,270,566.

According to my invention a container is provided with serial numerals of the decimal system, as 1, 2, 3, etc., arranged in horizontal rows of ten and reading from the numeral 1 as the left-hand numeral of the first row serially to the right through the succeeding rows, the numerals having the same units digits in the several rows being in vertical alinement. The object of this is to inculcate in the mind of the student that as written 11, 12, 13, etc., 21, 22, 23, etc., are composed by prefixing the same digit, as 1 or 2, etc., to 1, 2, 3, . . . 0 found in the topmost row of the container. With this container removable slips are used, they being arranged in coincidence with the respective numerals, each slip having repeated thereon a numeral which is the same as that on the container, with which it coincides, the slips being all the same in shape and size and the numerals being placed in the same relative positions on all the slips.

In the accompanying drawings,

Figure 3 is a perspective view of a container of the flat or sheet type, showing slips with serial numerals positioned thereon;

Figure 4 is a plan of the obverse and reverse sides of one form of the slips; and Figures 5 and 6 show another form of the slips.

Figure 1:
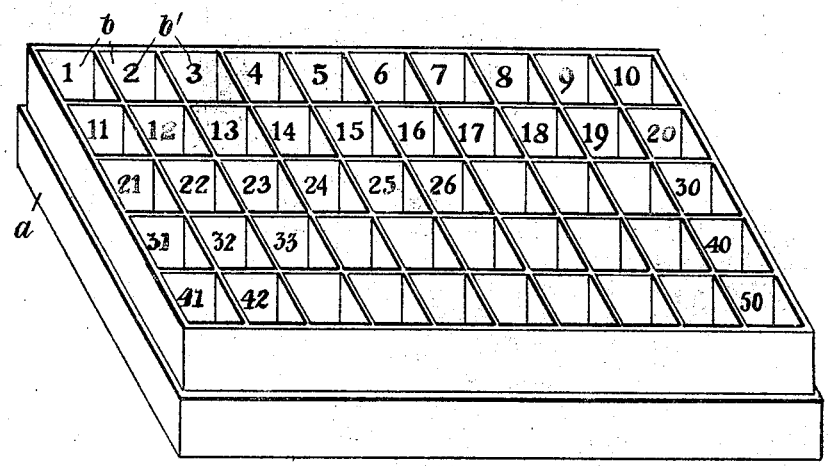
Figure 1 is a perspective view of a container of the cellular type.
Figure 2:
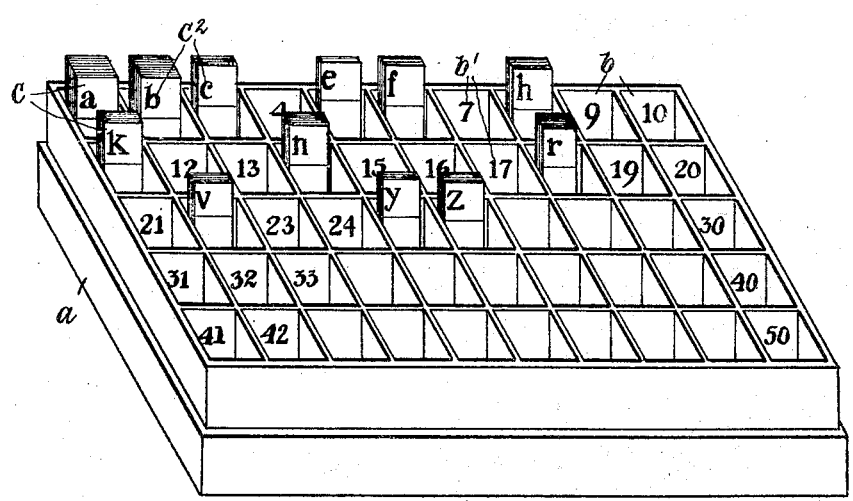
Figure 2 shows such container with the slips arranged therein.

In the drawings, $a$ designates a rectangular box having a bottom and four sides but open at the top and being divided by vertical partitions into ten vertical and any number of horizontal rows of cells $b$ of substantially identical shape and size. The back of each cell may have applied thereto near the top an index $b'$, as the numerals 1, 2, 3, etc., these reading from 1 for the topmost left-hand cell horizontally through the several rows always from left to right. As shown in the present example these numerals are 1 to 50 (they may be more or less), and where the container is intended for the filing of "alphabet" slips the first twenty-six of these numerals will correspond to the alphabet letters.

Elongated slips $c$ (Fig. 4) are provided all alike in shape and size. Arranged on one face (which will be the obverse face) of each so as to read from one long side and placed near its left-hand end may be one of a set of serial reading characters $c'$, as of the letters of the alphabet; there may be as many slips as desired for each such character. On the same face of the slip near its right-hand end and placed so as to be read from the left-hand end may be the same character as at the latter end as indicated at $c^2$. The slips are of such length that when placed in the cells they will project upwardly therefrom. They are shown placed in the cells so that their right-hand ends are uppermost, and also so that their obverse faces face forwardly, or all in the same direction as the cell characters $b'$, but they may be placed therein so that their obverse faces face rearwardly. The cells are only sufficiently wide to freely admit the slips and keep them upright. The slips will be arranged in alphabetical order, the "a" slip in the topmost extreme left-hand cell and the others in alphabetical order to the right and so on through the succeeding horizontal rows. The slips will bear numbers, as $c^3$, on the back (Fig. 4) to correspond to the cell characters $b'$ in which, thus alphabetically arranged, they belong, that is, the slips in cell 1 will have the numeral 1, in cell 2, the numeral 2, and so on. They may have incidentally the capitals of their alphabetical characters thereon, as "B" at $c^4$.

The slips (with reference to their characters $c'$ $c^4$) may be employed by the learner the same as clearly appears in my mentioned patents and will also be clearly evident from Fig. 3 hereof, the slips being placed in overlapping disposition so that their characters $c'$, or it may be $c^4$, form a reading line. When they are not in use the learner turns each to the upright position, so that the character $c^2$ is in the right-side-up or reading position, and then introduces the slip into its appropriate cell; the learner is supposed to know his alphabet and so is able to position them by reference to their alphabetical order, but in the process he can be made to make at the same time some progress in learning the numerical system with a little assistance because he will observe the characters $b'$ and $c^3$ and that they are alike. In addition the learner acquires orderliness. Moreover, in case of the arrangement of the characters $b$ $b'$ in horizontal rows of ten each he sees that as written numbers like 11, 12, 13, etc., 21, 22, 23, etc., are composed by prefixing the same digit, as 1 or 2, etc., to 1, 2, 3, ... 0. Further the slips are all so assembled with the container that any particular one can be selected readily without disturbing the others and they can as readily be replaced in the container. Or a container such as is shown in Fig. 3 may be used. This container forms what may be termed the service container in a system for teaching reading of numerals in which the container $a$ in Fig. 1 could be used as the storage container. When used according to my invention moreover, the container in Fig. 3 will have for use with it slips $f$ shown in Figs. 5 and 6 in which the numerals thereon are at the left hand ends and read from one long side of each slip, instead of being arranged on the slips as in Fig. 4. The container $d$ is a stiff sheet (it may be one leaf of a folder) having cemented or otherwise secured thereto strips $e$ arranged horizontally and spaced from each other and each having an inner rabbet $e'$ at its upper edge which forms a groove with the face of the sheet and has the indices $e^2$ (arranged as shown in Fig. 1) printed thereon. This container is so constructed that the slips may be arranged to overlap and so take a relation thereon which is at once orderly and brings the characters close to each other and in a definite and fixed relation to the character $e^2$ on the container.

The underlying purpose is to facilitate the mental effort of the student in learning his numerals by impressing on him that once he has mastered a comparatively few of them (as 1 to 10) it is only a matter of combining the digits in a definite way to produce and recognize any other. This is accomplished by arranging the serial numerals $b'$ or $e^2$ in horizontal rows of ten each and so that the numerals having the same units digits in the several rows are vertically alined, and by using slips of substantially the same form and size having the same numerals respectively appearing thereon as the numerals $b'$ or $e^2$.

It will be understood that my invention is especially designed for teaching young children and others entirely unfamiliar with written characters the very rudiments of the decimal system; and so it is important that simple devices like slips are employed and that these slips are of substantially the same size and shape, offering nothing to fix the attention of the learner beyond the characters appearing thereon.

Instead of providing a set or sets of slips which would have the pluri-digit numerals displayed on them I may provide sets of slips bearing only the uni-digit numerals 1 to 0, which will permit two such slips to be arranged in using the container of Fig. 3 to form a pluri-digit numeral; one particular advantage of this is that it facilitates a comprehension of the function of the cipher (0) in forming the pluri-digit numerals, this character always being troublesome to the uninitiated.

Having thus fully described my invention, what I claim as new and desire to secure by Letters Patent is:—

1. In combination, a container having serial numerals of the decimal system arranged in horizontal rows of ten each and reading progressively from the lowest numeral as the left-hand numeral of the first row serially to the right through each succeeding row, the numerals having the same units digits in the several rows being in vertical alinement with each other, and a set of removable slips all of substantially identical shape and size having respectively repeated on them the first-named numerals and adapted to be placed on the container in coincidence with its numerals and so that the numerals on the slips respectively correspond to the numerals of the container and the numeral of the last slip so placed remains visible.

2. In combination, a container having serial numerals of the decimal system arranged in horizontal rows of ten each and reading progressively from the lowest numeral as the left-hand numeral of the first row serially to the right through each succeeding row, the numerals having the same units digits in the several rows being in vertical alinement with each other, and a set of elongated slips respectively having on their left-hand ends and readable from one long side of each slip corresponding serial numerals of the decimal system, said slips being adapted to be placed one after another in overlapping disposition and in horizontal rows in juxtaposition to the first rows and with their own numerals in vertical registry with the numerals of said first rows.

In testimony whereof I affix my signature.

JENNIE L. THOMSON.